Nov. 21, 1967     M. R. KARGE     3,353,875

LINEAR MOTION BEARING ASSEMBLY

Filed July 27, 1964     4 Sheets-Sheet 1

INVENTOR.
MAXWELL R. KARGE
BY

HIS ATTORNEYS.

Nov. 21, 1967 M. R. KARGE 3,353,875
LINEAR MOTION BEARING ASSEMBLY
Filed July 27, 1964 4 Sheets-Sheet 2
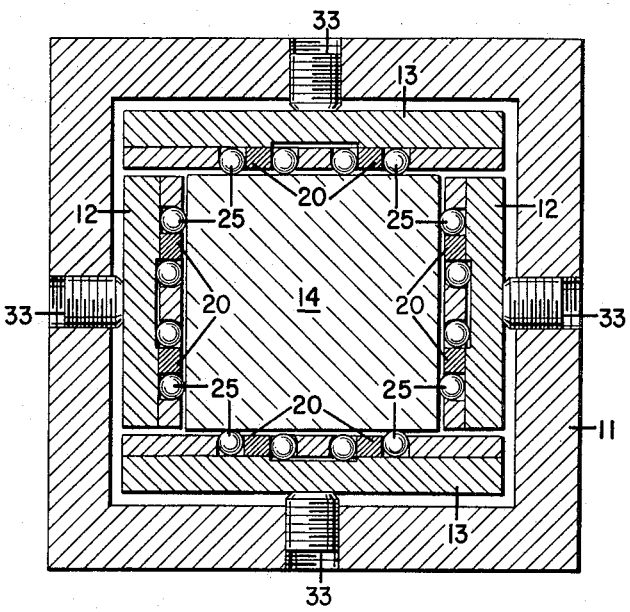
FIG. 3
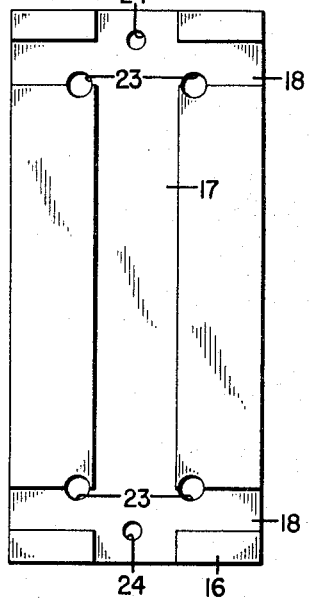
FIG. 4
FIG. 5
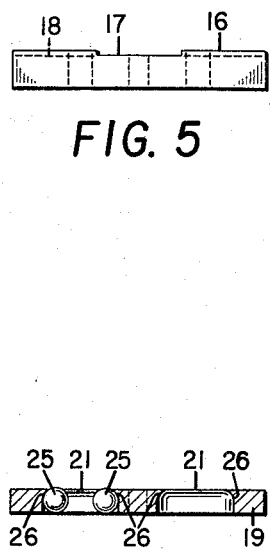
FIG. 7
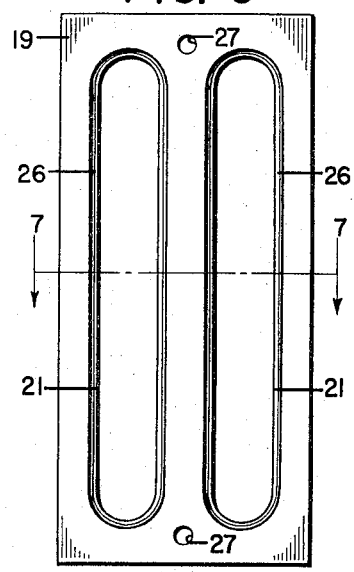
FIG. 6
INVENTOR.
MAXWELL R. KARGE
BY
Cumpston + Shaw
HIS ATTORNEYS.

Nov. 21, 1967  M. R. KARGE  3,353,875
LINEAR MOTION BEARING ASSEMBLY
Filed July 27, 1964  4 Sheets-Sheet 3

INVENTOR.
MAXWELL R. KARGE
BY
HIS ATTORNEYS.

Nov. 21, 1967    M. R. KARGE    3,353,875
LINEAR MOTION BEARING ASSEMBLY
Filed July 27, 1964    4 Sheets-Sheet 4

INVENTOR.
MAXWELL R. KARGE
BY
*Cumpston & Shaw*
HIS ATTORNEYS.

United States Patent Office 3,353,875
Patented Nov. 21, 1967

1

3,353,875
LINEAR MOTION BEARING ASSEMBLY
Maxwell R. Karge, 80 Park, Brockport, N.Y. 14420
Filed July 27, 1964, Ser. No. 385,446
21 Claims. (Cl. 308—6)

This invention relates to a linear motion bearing slide assembly and more particularly to a bearing slide assembly adapted to accommodate relative linear, longitudinal motion between the assembly and a shaft having a plurality of planar surfaces.

There have been many previous attempts to use bearing slide assemblies including recirculating ball bearings and other bearing materials to allow free sliding motion of a shaft without twist, shake, play, or binding friction. Various ball cages have been attempted and bearing housings have been shaped in various ways to provide ball races adjacent the shaft. These previous devices have suffered from lack of ruggedness and durability, lack of or loss of adjustment which often required expensive replacement, inability to provide zero play and zero twist compatibly with free sliding linear motion of the shaft, expense of production, difficulty of assembly, expense of repair or replacement, and other disadvantages.

It is an object of this invention to overcome the difficulties and shortcomings of previous linear motion bearing slide assemblies.

Another object of this invention is to support a shaft in a bearing assembly so that the shaft can move freely in either linear longitudinal direction without binding or sticking and yet be held free of play and twist.

Another object of the invention is to adjust a linear motion bearing slide assembly at any time during its life to obtain a predetermined preload relative to a shaft regardless of and in compensation for wear in the shaft or bearing assembly.

Another object of the invention is to clean and lubricate a shaft as it moves relative to a bearing assembly in which it is housed.

Another object of the invention is to provide a wide variety of sizes and shapes of linear motion bearing assemblies by using a relatively few standardized and individually replaceable and interchangeable parts.

Another object of the invention is to make linear motion recirculating ball bearing asemblies that are rugged, durable, and reliable, and yet are inexpensive to manufacture and convenient to assemble, lubricate, clean, repair, replace, and otherwise care for.

Another object of the invention is to provide a linear motion bearing slide assembly having a number of separate individual bearing members which include different bearing materials or means and which are individually interchangeable and replaceable.

To these and other ends the invention resides in certain improvements and combinations, all as will be hereinafter more fully described, the novel features being pointed out in the claims in the end of this specification.

In the drawings:

FIG. 3 shows a transverse cross section of the ball bearing asembly as asembled in FIG. 1;

FIG. 4 shows a top plan view of a base plate for a gib according to the invention;

FIG. 5 shows an end elevation of the base plate of FIG. 4;

2

Figure 8:
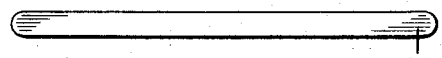
Figure 9:
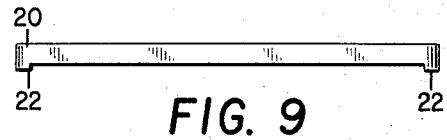
Figure 10:
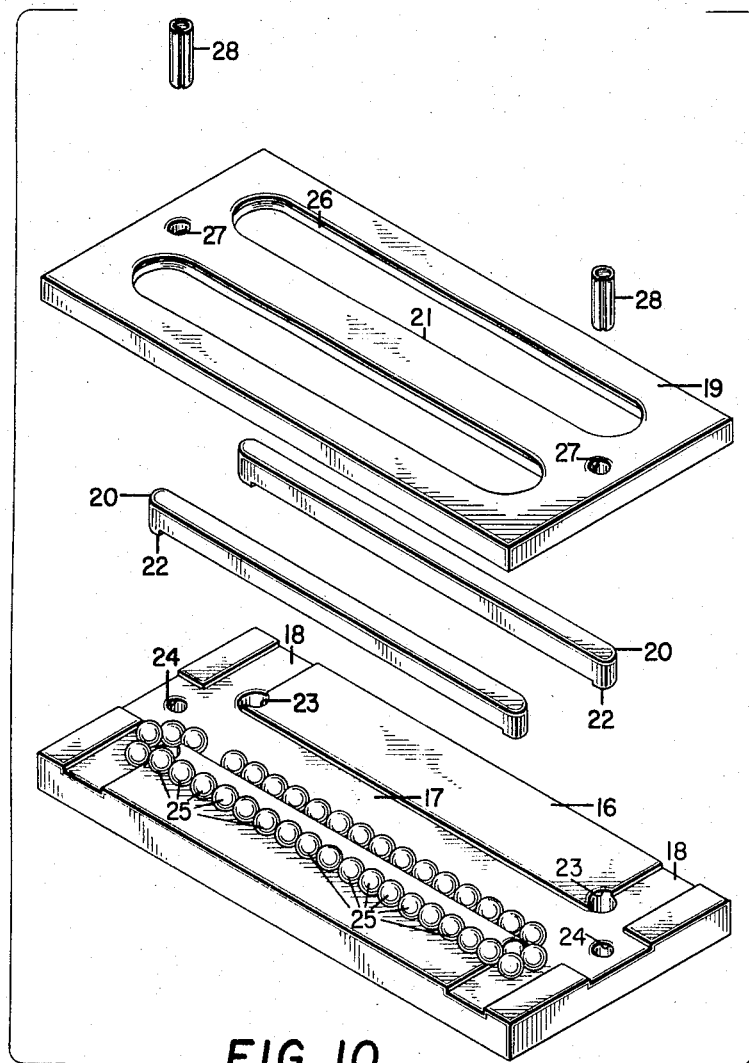
Figure 11:
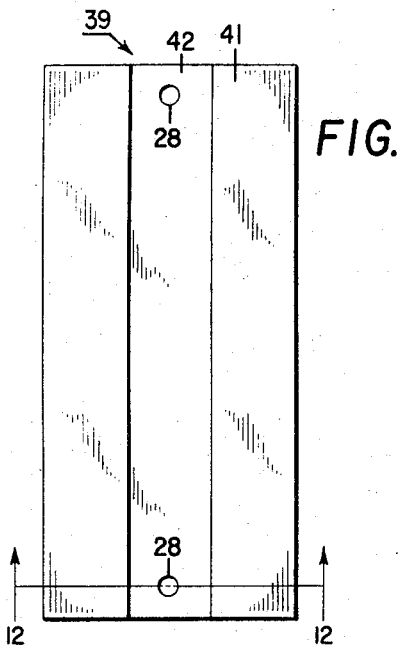
Figure 12:
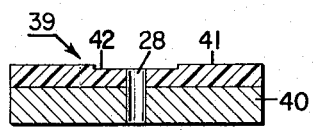

FIG. 6 shows a bottom view of a cage member for a gib according to the invention;

FIG. 7 shows a cross section of the cage member of FIG. 6 taken along the line 7—7;

FIG. 8 shows a top view of an island member for a gib according to the invention;

FIG. 9 shows a side elevation of the island member of FIG. 8;

FIG. 10 shows an exploded view of a gib according to the invention;

FIG. 11 shows a top view of an alternate form of gib according to the invention; and FIG. 12 shows a cross section of the gib of FIG. 11 taken along the line 12—12.

Figure 1:
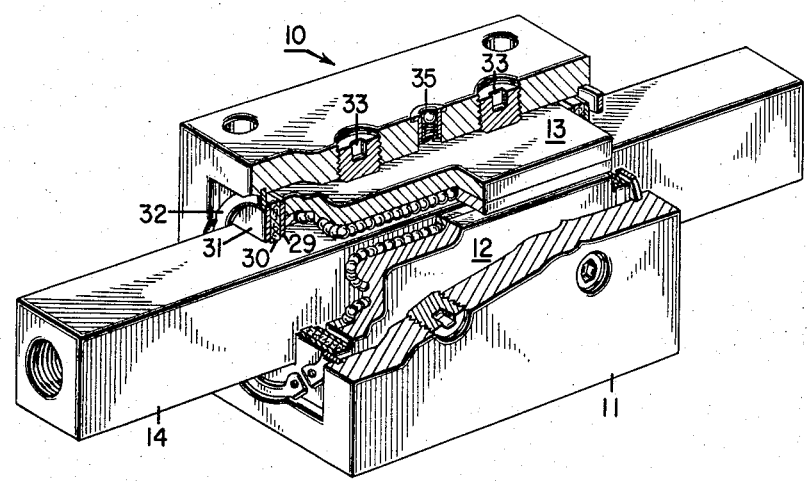
FIG. 1 shows a partially cut away perspective view of a bearing assembly according to the invention.

A preferred embodiment of the bearing assembly 10 according to the invention is shown as completely assembled and partially cut away in FIG. 1. Although the elements of the assembly will be described in more detail below, it can be seen from FIG. 1 that the assembly 10 comprises a housing 11 and ball bearing gibs 12 and 13 surrounding a shaft 14. Other forms of gib alternative to ball bearing gibs are also possible according to the invention, and will be described below.

Figure 2:
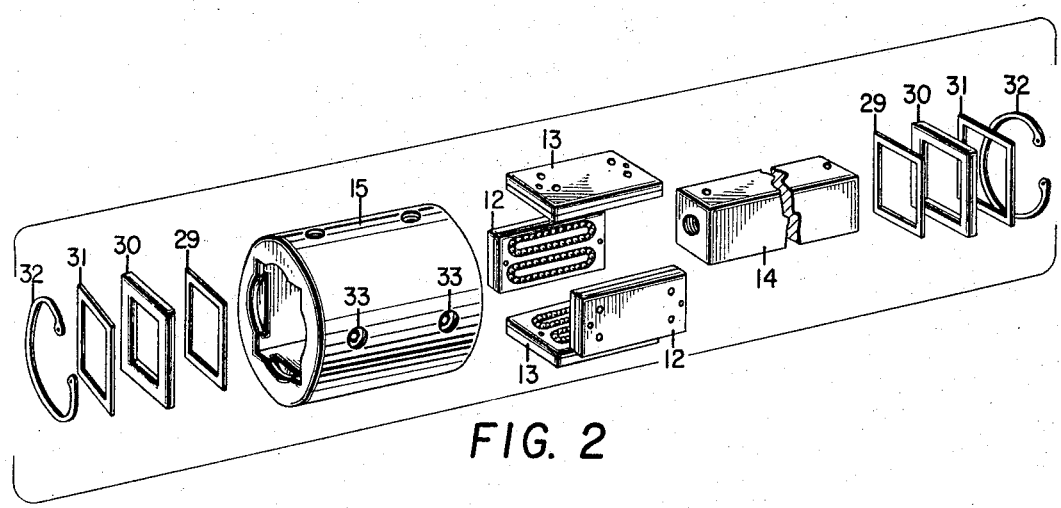
FIG. 2 shows an exploded view of a bearing assembly according to the invention.

An exploded view of an assembly such as that shown in FIG. 1 is illustrated in FIG. 2. The exploded elements of FIG. 2 are the same as those shown assembled in FIG. 1 except for the housing 15 being cylindrical rather than rectangular. It can also be seen from FIG. 2 that assembly generally comprises a housing 15, and side ball bearing gibs 12 and top and bottom ball bearing gibs 13 for surrounding and engaging shaft 14.

A transverse cross section of a ball bearing assembly such as illustrated in FIG. 1 is shown in FIG. 3. Corresponding elements of the invention are given the same reference numerals throughout the drawings so that the relation of gibs 12 and 13, housing 11, and shaft 14 can also be seen from FIG. 3.

In describing the invention, the details of several types of preferred bearing gibs according to the invention will first be set out, and then a preferred embodiment of a complete bearing assembly will be detailed.

BEARING GIB

A bearing gib according to the invention can be provided with various bearing means including ball bearings, flourocarbons, polytetraflouroethylene, bronze, babbit, Arguto, and other materials. For many applications, ball bearing gibs are important and will be first described.

A preferred form of ball bearing gib according to the invention is illustrated in detail in FIGS. 4–10. It can be seen from such views that each gib comprises a pair of oblong oval races of balls 25 surrounding island members 20 and retained by cage member 19. One bearing surface for each oval of balls 25 is formed in base plate 16 and the opposing bearing surface comprises the shaft each planar surface of which is engaged by a gib.

FIGS. 4 and 5 show a race or base plate 16 for a gib according to the invention. Since a portion of base plate 16 forms a race for loaded ball bearings, it is preferably surface hardened, or made of hard steel or other hard material to resist wear.

Portions of base 16 are recessed to form a non-bearing portion or reach for each ball bearing race for free balls that are not bearing a load. Load bearing balls engage both the supported shaft and unrecessed surface portions or reaches of base plate 16, but balls not under load roll freely in the recessed portion or reach of each race. Appropriately disposed recesses can be formed in base plate 16 in a variety of ways, but it is preferred to form a longitudinal shallow recess 17 lengthwise of generally oblong base plate 16. Also, a pair of equally shallow recesses 18 are preferably formed transversely across base plate 16 near its respective opposite ends. Recesses 17 and 18 can easily be formed by grinding away portions of the surface of base plate 16, and can be any appropriate depth depending upon clearances and parameters of other elements of the assembly.

The center portions or reaches of the two elongated oval races are filled by island members 20 best shown in FIGS. 8–10. Island members 20 are secured to base plate 16 preferably by engaging projections 22 in locating apertures 23 in base plate 16. Island locating apertures 23 can be accurately positioned relative to assembly locating apertures 24 located in base plate 16. Islands 20 can be fastened to base plate 16 by any of a variety of means, but epoxy cement is economical, simple, satisfactory, and preferred.

As can be seen from FIGS. 4 and 10, when island members 20 are secured to base plate 16 by locating in apertures 23, island members 20 will be parallel and adjacent the central longitudinal recess 17 ground in base plate 16. Ball bearings 25 are adapted to travel around island members 20 in oblong races, and on the inner side of islands 20 such ball bearings travel in recess 17 and are thus relatively lower than ball bearings traveling on the outer side of islands 20.

One of many acceptable alternatives is to widen central recess 17 in base plate 16 and to position island members 20 within recess 17 and adjacent the outer edges of recess 17. With either arrangement, the ball bearings outboard of island members 20 are somewhat elevated above the ball bearings traveling inboard of island members 20.

Ball bearings 25 are retained in their elongated oval races by a cage member 19 in cooperation with island members 20. Cage member 19 as shown in FIGS. 6 and 7 is preferably formed as a cover plate coextensive with and overlying base plate 16. Two oblong oval apertures 21 are formed in cage member 19 and arranged so as to overlie the races of ball bearings surrounding island members 20. As best shown in FIG. 7, the sides 26 of the oblong apertures 21 in cage member 19 are preferably curved or sloped so as to form a narrower opening at the top than at the bottom of cage member 19. The slope or curvature of sides 26 of apertures 21 prevents the balls from falling from their races and yet allows them, and especially the ball bearings in the outer reaches of each race, to extend above the upper surface of cage member 19 so as to bear against a shaft. Of course, similar slopes or curves can be formed in the side walls of island members 20 for similarity retaining ball bearings 25 in their races. Sloping or curving of either the sides of island members 20 or the surfaces 26 of apertures 21 are preferred over a separate flange or cover plate fastened to island members 20 or cage member 19 because of greater strength, simplicity, and efficiency. The material around apertures 21 quickly thickens away from the upper inner edges of the apertures so as to provide a strong, sturdy, simple, and effective ball bearing retaining means without separate parts or fasteners being required.

Apertures 21 in cage member 19 can be accurately positioned relative to locating and fastening holes 27 that are made to conform accurately to similar holes 24 in base plate 16. Cage member 19 is fastened to base plate 16 preferably with the aid of slotted hollow pins 28 as shown in FIG. 10, or by dowel, screws, or other devices through holes 27 and 24. Epoxy cement serves well to complete the joining of cage member 19 to base plate 16.

A prefererd method of assembling a ball bearing gib according to the invention is to fasten island members 20 to base plate 16 and to bring cage member 19 into spaced registry with base plate 16 by means of pins 28. The two races are then filled with balls 25 except for a small amount of slack, for example the space occupied by one ball. Then cage member 19 is pressed down onto base plate 16 and secured thereto to retain the ball bearings 25 in their races. Such a gib is solid and strong, free from warp or twist, and accordingly very accurate and durable.

Similar gibs can be made according to the invention using bearing means other than ball bearings. Many different bearing materials are well known in the bearing art and suitable for various applications. Such bearing materials include bronze, babbit, Arguto, fluorocarbons, and polytetrafluoroethylene. Such an alternative gib 39 is illustrated in FIGS. 11 and 12 and comprises a base plate 40 and a bearing face or bearing plate 41. Base plate 40 is preferably formed of steel or other hard and rigid material to provide a firm support for the bearing material 41 on the face of the gib 39.

Base plate 40 for gib 39 can be similar to base plate 16 for the previously described ball bearing gibs 12 or 13 except for the lack of recesses in its upper surface. In place of ball bearing races, a face lamina 41 of bearing material such as polytetrafluoroethylene is secured to base plate 40. For most applications, longitudinal groove 42 is preferably formed in the face surface of the bearing material lamina 41 to reduce the total fraction of the gib relative to the shaft it engages. The groove 42 is preferably shallow and centrally located so that the bearing engagement between the gib and the shaft occurs along the outer edges of the gib. One of the advantages of groove 42, especially with bearing materials such as bronze and babbit, is that it provides a reservoir for lubricating oils, but of course, groove 42 can be omitted entirely, can be replaced by a plurality of grooves, or can be located other than centrally.

Gib 39 can be assembled in a way similar to the previously described assembly of ball bearing gibs by using dowels 28 through registering holes in the bearing material lamina 41 in the base plate 40. Also, epoxy cement can be used to securely fasten lamina 41 to base plate 40. Gibs 39 can be made in narrow and wide widths corresponding to gibs 12 and 13 and are preferably made to the same standard sizes as ball bearing gibs so as to be interchangeable therewith.

BEARING ASSEMBLY

Although gibs according to the invention can be put to a variety of uses and can serve many valuable purposes, they are especially suited to arrangement in a bearing assembly to allow linear motion of a shaft relative to a housing for the gibs. Preferably two wide gibs 13 such as shown in FIGS. 1–3 and two narrow gibs 12 are arranged within housings such as housing 11 of FIGS. 1 and 3 or housing 15 of FIG. 2 to form a linear motion bearing assembly according to the invention. Ball bearing gibs, and gibs formed of other bearing materials such as illustrated in FIGS. 11 and 12 can be selected according to the application intended, and ball bearing and other forms of bearing gibs can be mixed in one assembly or interchanged with each other in various assemblies.

In assembling the gibs, it is preferred to place a wide gib at the bottom of a housing and arrange narrow gibs atop of it so as to support an upper wide gib in spaced relation from the lower wide gib to provide a space between the gibs for insertion of a shaft 14. Shaft 14 is preferably supported by the outer reaches of each race of ball bearings in each gib or by the outer edges of the face surfaces of bearing material laminae 41 for gibs 39 so that two rows of ball bearings or two strips of bearing material engage each planar surface of shaft 14 as best shown in the cross section of FIG. 3.

As shown in FIGS. 1 and 2 the gibs are retained in their housings by inner washers 29, fibrous washers 30, outer washers 31 and retaining rings 32, all arranged at each end of a housing. Washers 29 and 31 are preferably formed of steel or other strong material, and washer 30 is preferably formed of fibrous material such as felt. The functions of fibrous washers 30 are to wipe the shaft 14 clean as it travels back and forth through the housing so as to remove dust and foreign particles, to absorb excess lubricating oil from the housing or the shaft thus regulating lubrication and providing a reservoir of lubricating fluid or material and to deposit a thin coating of lubricant onto shaft 14 as it moves relative to the housing. Washers 30 thus play an important part in keeping gibs 12 and 13 clean, free running, and well lubricated and add to the life and efficiency of the bearing assembly.

By removing retaining rings 32 and washers 31 fibrous washers 30 can easily be removed and cleaned or replaced without affecting the adjustment of the gibs and the shaft 14. Also, such easy removal of retaining rings and washers allows quick and simple disassembly of the shaft and gibs within the housing for replacement of gibs or cleaning or repair of gibs or shaft.

At least one gib for a triangular shaft and two gibs for a rectangular shaft are adjustable according to the invention, and preferably each gib is so adjustable for a predetermined preload relative to shaft 14. A preferred means for adjusting the gibs is by set screws 33 shown in FIGS. 1–3. In the illustrated embodiment a pair of set screws 33 is used for adjusting each gib of the four that are arranged in each housing. With relatively smaller assemblies a single set screw is suitable for adjusting each gib, and it is preferred and desirable for larger assemblies to use three or four set screws for each adjustable gib. Set screws can be provided with lock nuts or can have well-known nylon washers in their threads so as to be self locking. Set screws 33 provide easy adjustment for the gibs and allow the gibs to be taken up periodically as they wear. The ball bearing gibs wear grooves into their own races and shaft 14, and the presence of such grooves, rather than destroying the usefulness of the bearing assembly, can be taken advantage of through the adjustability of the gibs so that such grooves offer a greater bearing surface to each ball in the race. Of course such grooves can be preformed in the gib races to prevent side play of the balls and to gain the increased bearing surface.

Set screws 33 also effectively space each gib a small distance from the inner wall of its housing so as to provide a free passageway throughout the entire bearing assembly for lubricant admitted to the assembly through aperture 35. This simplifies and improves lubrication of the housing and enhances the cleanliness and long life of the assembly. The gibs of the bearing assembly according to the invention can be adjusted relative to shaft 14 until shaft 14 is allowed no twist or play relative to the gib housing but still can slide freely within the gibs for optimum operating efficiency. A preferred way of accomplishing such adjustment is to clamp the assembled housing in a fixed position and use indicators to detect play in shaft 14. The set screws 33 are tightened until such play is barely eliminated and shaft 14 is still freely slidable within the gibs.

In the illustrated embodiments, four gibs are shown in a housing surrounding a shaft 14 that is square in cross section, but it should be understood that shafts that are rectangular in cross section and shafts that have three, five, six or other numbers of flat sides are possible within the spirit of the invention. Also, gibs can be arranged in dual or tandem relation, and large housings can be filled with great numbers of gibs according to the invention to make large bearing assemblies by using only a few standard gib sizes.

Also, it should be understood that gibs according to the invention are interchangeable and individually replaceable because of standardized sizes. Furthermore, ball bearing gibs may be inter-mixed with bronze, babbit, polytetraflouroethylene or gibs having other bearing means within the same assembly. For example, it is often advantageous to use a solid bearing material type of gib 39 for the bottom gib of a housing since such gib often bears a much greater load than other gibs in the housing and many solid bearing materials can withstand large loads more successfully than a ball bearing gib. Other gibs in the same assembly can be ball bearing gibs or gibs formed of other bearing materials for engaging the vertical and top sides of the supported shaft. Thus, assemblies according to the invention can meet a wide variety of bearing needs and yet maintain their adjustableness and freedom from twist or play in spite of wear.

While the invention has been disclosed herein by reference to the details of a preferred embodiment, it is to be understood that such disclosure is intended in an illustrative, rather than a limiting sense, and it is contemplated that various modifications of the construction and arrangement of parts will readily occur to those skilled in the art within the spirit of the invention and the scope of the appended claims.

I claim:

1. A recirculating ball bearing gib comprising: an oblong base plate having formed in its upper face surface a shallow, centrally disposed, longitudinal recess and a pair of spaced, shallow, transverse recesses near respective opposite ends of said base plate; a pair of generally linear, oblong, island members having rounded ends and secured to said upper surface of said base plate and extending above said upper surface of said base plate, said island members being arranged parallel to each other and adjacent said longitudinal recess on opposite sides thereof and extending between said transverse recesses; a unitary ball cage member formed as a plate overlying and secured to said base plate and extending above said upper surface of said base plate by substantially the same extent as said island members, said cage member cooperating with said island members to retain balls, said cage member having a pair of oblong, parallel, longitudinally disposed, spaced apertures formed therethrough, the surfaces defining said apertures being disposed to surround said island members in spaced relation to the sides thereof; and a plurality of ball bearings surrounding said island members and substantially filling the spaces between said sides of said island members and said surfaces defining said apertures, each of said balls having a diameter greater than the thickness of said cage member and forming two generally linear, oblong ball races, the inner reach of each race being recessed relative to the outer reach of each race, and the balls in each of said outer reaches extending above the upper surfaces of said cage member and said island members.

2. The gib specified in claim 1 wherein said apertures are narrower at the top of said cage member than at the bottom of said cage member.

3. The gib specified in claim 2 wherein said surfaces defining such apertures are curved in vertical cross section.

4. A recirculating ball bearing gib comprising: a generally rectangular base plate of hard material having an upper surface in which is formed a shallow, centrally disposed, longitudinal recess and a pair of spaced, shallow, transverse recesses near respective opposite ends of said base plate; a pair of generally linear, oblong, island members having straight parallel sides and rounded ends and secured to said upper surface of said base plate and extending above said upper surface of said base plate, said island members being arranged parallel to each other and adjacent said longitudinal recess on opposite sides thereof and extending between said transverse recesses; a unitary ball cage member cooperating with said island members to retain ball bearings in said gib and formed as a plate overlying and coextensive with said base plate and secured to said base plate, said ball cage member extending above said upper surface of said base plate by substantially the same extent as said island members and having a pair of oblong, parallel, longitudinally disposed, spaced apertures formed therethrough, the walls of said apertures being curved in the vertical plane so that said apertures are larger at the bottom of said ball cage member than at the top of said ball cage member, and said aperture walls surrounding each of said island members in spaced relation thereto to the sides thereof; and a plurality of uniform ball bearings surrounding said island members and substantially filling the spaces between said sides of said island members and said walls of said apertures, each of said balls having a diameter greater than the extension of said cage member and said island members above the unrecessed portions of said upper surface of said base plate and forming two generally linear, oblong ball bearing races in said gib, each of said races having generally linear inner reaches and generally linear outer reacher, the inner reach of each race being recessed relative to the outer reach of each race, and the balls in each of said outer reaches extending above the upper surfaces of said cage member and said island members.

5. A linear motion ball bearing assembly comprising: a shaft having a plurality of planar surfaces; a plurality of gibs each bearing upon one of said planar surfaces of said shaft; and said gibs being retained in a housing wherein at least one of said gibs is adjustable for a predetermined preload relative to said shaft, at least one of said gibs comprising:
   (a) a rigid, oblong base plate having an upper surface formed with a shallow, central, longitudinal recess;
   (b) a pair of oblong island members secured to said base plate on said upper surface thereof and bordering respectively along opposite edges of said recess;
   (c) a unitary ball cage plate formed with a pair of generally oval apertures, said ball cage plate overlying and secured to said base plate, and the surfaces defining said apertures being disposed to surround and to be spaced substantially uniformly from said respective island members; and
   (d) a plurality of ball bearings substantially filling a pair of generally oval races formed between said ball cage plate and said island members, said balls in unrecessed outer reaches of said races extending above the upper surface of said cage plate.

6. The bearing assembly specified in claim 5 including set screws threaded in said housing and engaging the back of at least one of said gibs.

7. The bearing assembly specified in claim 5 having a pair of fibrous washers one of which closely surrounds said shaft at each respective end of said housing for wiping and lubricating said shaft as it moves relative to said housing.

8. A linear motion ball bearing assembly comprising: a housing; a straight shaft having four planar surfaces and uniform dimensions throughout a substantial bearing length; a plurality of gibs retained in said housing, at least three of said planar surfaces of said shaft being engaged by respective gibs, and at least one of said gibs being adjustable for a predetermined preload relative to said shaft, at least one of said gibs comprising:
   (a) a rigid, oblong base plate having an upper surface formed with a shallow, central, longitudinal recess;
   (b) a pair of oblong island members secured to said base plate on said upper surface thereof and bordering respectively along opposite edges of said recess;
   (c) a unitary ball cage plate formed with a pair of generally oval apertures, said ball cage plate overlying and secured to said base plate, and the surfaces defining said apertures being disposed to surround and to be spaced substantially uniformly from said respective island members; and
   (d) a plurality of ball bearings substantially filling a pair of generally oval races formed between said ball cage plate and said island members, said balls in unrecessed outer reaches of said races extending above the upper surface of said cage plate.

9. The bearing assembly specified in claim 8 wherein said shaft is rectangular and including a pair of fibrous washers, one of which closely surrounds said shaft at each end of said housing for lubricating and wiping said shaft as it moves relative to said housing, and set screws threaded in said housing engage the back of at least two of said gibs.

10. A recirculating ball bearing gib comprising:
   (a) a rigid, oblong base plate having an upper surface formed with a shallow, central, longitudinal recess;
   (b) a pair of oblong island members secured to said base plate on said upper surface thereof and extending above said upper surface of said base plate, said island members bordering respectively along opposite edges of said recess;
   (c) a unitary ball cage plate formed with a pair of generally oval apertures, said ball cage plate overlying and secured to said base plate and extending above said base plate by substantially the same distance as said island members, and the surfaces defining said apertures being disposed to surround and to be spaced substantially uniformly from the sides of said respective island members; and
   (d) a plurality of ball bearings substantially filling a pair of generally oval races formed between said ball cage plate and said sides of said island members, said balls in unrecessed outer reaches of said races extending above the upper surface of said cage plate, and said island members.

11. The gib of claim 10 wherein said edges of said recess are generally parallel, said island members each have generally linear, parallel sides, and rounded ends, and said island members are disposed generally parallel to each other on said base plate.

12. The gib of claim 10 wherein said upper surface of said base plate is formed to define a pair of shallow transverse recesses near respective opposite ends of said base plate, and said island members each extend from one of said transverse recesses to the other.

13. The gib of claim 10 wherein said apertures are narrower at the top of said cage plate than at the bottom os said cage plate.

14. The gib of claim 13 wherein said aperture surfaces are curved inward from bottom to top.

15. A linear motion ball bearing assembly comprising: a housing; a straight shaft rectangular in cross section and of uniform dimensions throughout a bearing length; four gibs retained in said housing, one of said gibs engaging each surface of said rectangular shaft; set screws threaded through said housing and disposed for engaging the backs of at least two of said gibs for urging said gibs into a predetermined preload engagement with said shaft, and at least one of said gibs comprising:
   (a) a rigid, oblong base plate having an upper surface formed with a shallow, central, longitudinal recess;
   (b) a pair of oblong island members secured to said base plate on said upper surface thereof and bordering respectively along opposite edges of said recess;
   (c) a unitary ball cage plate formed with a pair of generally oval apertures, said ball cage plate overlying and secured to said base plate, and the surfaces defining said apertures being disposed to surround and to be spaced substantially uniformly from said respective island members; and
   (d) a plurality of ball bearings substantially filling a pair of generally oval races formed between said ball cage plate and said island members, said balls in unrecessed outer reaches of said races extending above the upper surface of said cage plate.

16. The ball bearing assembly of claim 15 wherein a pair of fibrous washers each closely surround said shaft at each end of said housing for cleaning and lubricating said shaft as it moves relative to said housing, and said housing has a top-oriented aperture for lubricating said gibs and said washers.

17. A linear motion ball bearing assembly comprising: a shaft having a plurality of planar surfaces; a plurality of gibs each bearing upon one of said planar surfaces of said shaft; and said gibs being retained in a housing wherein at least one of said gibs is adjustable for a predetermined preload relative to said shaft, at least one of said gibs comprising: an oblong base plate having formed in its upper face surface a shallow, centrally disposed, longitudinal recess and a pair of spaced, shallow, transverse recesses near respective opposite ends of said base plate; a pair of generally linear, oblong, island members having rounded ends and secured to said upper surface of said base plate, said island members being arranged parallel to each other and adjacent said longitudinal recess on opposite sides thereof and extending between said transverse recesses; a unitary ball cage member formed as a plate overlying and secured to said base plate and cooperating with said island members to retain balls, said cage member having a pair of oblong, parallel, longitudinally disposed, spaced apertures formed therethrough, the surfaces defining said apertures being disposed to surround said island members in spaced relation thereto; and a plurality of ball bearings substantially filling the spaces between each of said island members and said surfaces defining said apertures, each of said balls having a diameter greater than the thickness of said cage member and forming two generally linear, oblong ball races, the inner reach of each race being recessed relative to the outer reach of each race, and the balls in each of said outer reaches extending above the upper surfaces of said cage member and said island members.

18. A linear motion ball bearing assembly comprising: a housing; a straight shaft having four planar surfaces and uniform dimensions throughout a substantial bearing length; a plurality of gibs retained in said housing, at least three of said planar surfaces of said shaft being engaged by respective gibs, and at least one of said gibs being adjustable for a predetermined preload relative to said shaft, at least one of said gibs comprising: an oblong base plate having formed in its upper face surface a shallow, centrally disposed, longitudinal recess and a pair of spaced, shallow, transverse recesses near respective opposite ends of said base plate; a pair of generally linear, oblong, island members having rounded ends and secured to said upper surface of said base plate, said island members being arranged parallel to each other and adjacent said longitudinal recess on opposite sides thereof and extending between said transverse recesses; a unitary ball cage member formed as a plate overlying and secured to said base plate and cooperating with said island members to retain balls, said cage member having a pair of oblong, parallel, longitudinally disposed, spaced apertures formed therethrough, the surfaces defining said apertures being disposed to surround said island members in spaced relation thereto; and a plurality of ball bearings substantially filling the spaces between each of said island members and said surfaces defining said apertures, each of said balls having a diameter greater than the thickness of said cage member and forming two generally linear, oblong ball races, the inner reach of each race being recessed relative to the outer reach of each race, and the balls in each of said outer reaches extending above the upper surfaces of said cage member and said island members.

19. A linear motion ball bearing assembly comprising: a housing; a straight shaft rectangular in cross section and of uniform dimensions throughout a bearing length; four gibs retained in said housing, one of said gibs engaging each surface of said rectangular shaft; set screws threaded through said housing and disposed for engaging the backs of at least two of said gibs for urging said gibs into a predetermined preload engagement with said shaft, and at least one of said gibs comprising: a generally rectangular base plate of hard material having an upper surface in which is formed a shallow, centrally disposed, longitudinal recess and a pair of spaced, shallow, transverse recesses near respective opposite ends of said base plate; a pair of generally linear, oblong, island members having straight parallel sides and rounded ends and secured to said upper surface of said base plate, said island members being arranged parallel to each other and adjacent said longitudinal recess on opposite sides thereof and extending between said transverse recesses; a unitary ball cage member cooperating with said island members to retain ball bearings in said gib and formed as a plate overlying and coextensive with said base plate and secured to said base plate, said ball cage member having a pair of oblong, parallel, longitudinally disposed, spaced apertures formed therethrough, the walls of said apertures being curved in the vertical plane so that said apertures are larger at the bottom of said ball cage member than at the top of said ball cage member, and said aperture walls surrounding each of said island members in spaced relation thereto; and a plurality of uniform ball bearings substantially filling the spaces between each of said island members and said walls of said apertures, each of said balls having a diameter greater than the extension of said cage member and said island members above the unrecessed portions of said upper surface of said base plate, and forming two generally linear, oblong ball bearing races in said gib, each of said races having generally linear inner reaches and generally linear outer reaches, the inner reach of each race being recessed relative to the outer reach of each race, and the balls in each of said outer reaches extending above the upper surfaces of said cage member and said island members.

20. A linear motion ball bearing assembly comprising: a shaft having a plurality of planar surfaces; a plurality of gibs each bearing upon one of said planar surfaces of said shaft; and said gibs being retained in a housing wherein at least one of said gibs is adjustable for a predetermined preload relative to said shaft, at least one of said gibs comprising:
   (a) a rigid, oblong base plate having an upper surface formed with a shallow, central, longitudinal recess;
   (b) a pair of oblong island members secured to said base plate on said upper surface thereof and bordering respectively along opposite edges of said recess;
   (c) a unitary ball cage plate formed with a pair of generally oval apertures, said ball cage plate overlying and secured to said base plate, and the surfaces defining said apertures being disposed to surround and to be spaced substantially uniformly from said respective island members;
   (d) a plurality of ball bearings substantially filling a pair of generally oval races formed between said ball cage plate and said island members, said balls in unrecessed outer reaches of said races extending above the upper surface of said cage plate; and
   (e) a top-oriented aperture on said housing for receiving lubrication for said gibs.

21. A linear motion ball bearing assembly comprising: a housing; a straight shaft having four planar surfaces and uniform dimensions throughout a substantial bearing length; a plurality of gibs retained in said housing, at least three of said planar surfaces of said shaft being engaged by respective gibs, and at least one of said gibs being adjustable for a predetermined preload relative to said shaft, at least one of said gibs comprising:
   (a) a rigid, oblong base plate having an upper surface formed with a shallow, central, longitudinal recess;
   (b) a pair of oblong island members secured to said base plate on said upper surface thereof and bordering respectively along opposite edges of said recess;
   (c) a unitary ball cage plate formed with a pair of generally oval apertures, said ball cage plate overlying and secured to said base plate, and the surfaces defining said apertures being disposed to surround and to be spaced substantially uniformly from said respective island members;
   (d) a plurality of ball bearings substantially filling a pair of generally oval races formed between said ball cage plate and said island members, said balls in unrecessed outer reaches of said races extending above the upper surface of said cage plate; and (e) a top-oriented aperture on said housing for receiving lubrication for said gibs.

References Cited

UNITED STATES PATENTS

| | | | |
|---|---|---|---|
| 1,881,675 | 10/1932 | Klausmeyer | 308—6 |
| 2,342,946 | 2/1944 | Tourneau | 308—3 |
| 2,509,749 | 5/1950 | Thomson | 308—6 |
| 2,576,269 | 11/1951 | Thomson | 308—6 |
| 2,628,135 | 2/1953 | Magee | 308—6 |
| 2,681,836 | 6/1954 | Jarund | 308—6 |
| 2,889,181 | 6/1959 | Lang | 308—6 |

FOREIGN PATENTS

| | | |
|---|---|---|
| 1,059,642 | 3/1954 | France. |
| 429,976 | 6/1935 | Great Britain. |

OTHER REFERENCES

Automotive Industries, Aug. 15, 1945, p. 83.

MARTIN P. SCHWADRON, *Primary Examiner.*

DAVID J. WILLIAMOWSKY, *Examiner.*

L. L. JOHNSON, *Assistant Examiner.*